United States Patent [19]

O'Connell et al.

[11] Patent Number: 4,964,086

[45] Date of Patent: Oct. 16, 1990

[54] METHOD FOR CHARACTERIZING VELOCITY ESTIMATES

[75] Inventors: Richard J. O'Connell, Cambridge, Mass.; Chandra S. Rai, Tulsa; Carl H. Sondergeld, Broken Arrow, both of Okla.

[73] Assignee: Amoco Corporation, Chicago, Ill.

[21] Appl. No.: 424,430

[22] Filed: Oct. 20, 1989

[51] Int. Cl.$^5$ .............................................. G01V 1/30
[52] U.S. Cl. ........................................ 367/38; 367/62; 364/421
[58] Field of Search ....................... 367/13, 37, 59, 62, 367/38, 60; 364/421; 73/597

[56] References Cited

U.S. PATENT DOCUMENTS 4,122,431 10/1978 Peraldi .................................. 367/58
4,740,928 4/1988 Gutowski et al. .................... 367/59

Primary Examiner—Ian J. Lobo
Attorney, Agent, or Firm—Timothy D. Stanley

[57] ABSTRACT

The present invention provides a novel method for obtaining quality indices for objectively characterizing seismic velocity estimates in geophysical data bases.

12 Claims, 3 Drawing Sheets

METHOD FOR CHARACTERIZING VELOCITY ESTIMATES

The present invention relates generally to a method of geophysical exploration and more particularly to a method for obtaining quality indices for objectively characterizing seismic velocity estimates in geophysical data bases.

One of the major problems associated with data bases in general, is assessing the quality of the input data. Quality control of seismic velocity estimates in geophysical data bases is particularly troublesome because of the subjective methods oftentimes employed to obtain such velocity estimates. Typically, estimates of seismic velocities of propagation in the earth are obtained from time series signals which record the earth's response to imparted energy. Alternatively, estimates of seismic velocities of propagation can be obtained using a pulse transmission technique on samples of the earth's formations. In either case because of inhomogeneities and variations in the composition in the materials comprising the earth, the general character or visual appearance of the recorded time series signals can vary widely. Exemplifying such variations in character of the recorded time series signals are: spectral content, amplitude, signal-to-noise ratio as well as a myriad of other visual parameters which can be observed by skilled geophysical data analysts.

Such variations in the character of the recorded time series signals affect the ability of geophysical data interpreters to accurately and reproducibly estimate the velocities of propagation of seismic energy in the earth. In spite of such impediments to reproducibly and accurately estimating seismic velocities of propagation, a numerical value for seismic velocity is obtained and entered into a geophysical data base without any indication of the degree of difficulty or level of confidence in the estimate obtained. Consequently, geophysical data bases comprising estimates of seismic velocities can have a wide range of levels of confidence in their accuracy without any indication of such confidence level.

The present invention describes a novel method for obtaining quality indices for objectively characterizing estimates of seismic velocities of propagation obtained from time series signals. These indices can provide an indication of the level of confidence in the estimates of the seismic velocities of propagation stored in a geophysical data base. Unlike conventional signal-to-noise (S/N) ratios which typically obtain a measure of the energy for the signal component of the recorded time series signals divided by all remaining energy (i.e., for the noise component) at a selected time, the present invention obtains quality indices from measures of energy as well as measures of the temporal content and spectral content of both the signal and noise components of the recorded time series signal.

SUMMARY OF THE INVENTION

The present invention provides a novel method for obtaining quality indices for objectively characterizing geophysical data bases. In particular, quality indices can be obtained to characterize velocity estimates obtained from time series signals comprising a geophysical data base.

A time series signal representative of the propagation of seismic energy through the earth's formations is obtained and an estimate is made of the arrival time or velocity of propagation of the seismic energy recorded in the time series signal. A selected time window of the time series signals about the estimated arrival time is Fourier transformed at selected intervals within the time window and time variant power spectra are calculated therefrom. Weighting functions are developed to reward spectral and temporal aspects of the Fourier signals within selected bands of the propagating seismic energy and penalize spectral and temporal aspects of the Fourier signals outside the selected bands. By multiplying the weighting functions with the time variant power spectra values, one can obtain a matrix of quality indices for characterizing velocity estimates obtained from the time series signal. A single valued quality index can be obtained by summing this matrix. Alternatively, one can obtain quality indices for both the signal and noise components of the time series signal employing reciprocal weighting functions and time variant power spectra. By obtaining a ratio of the quality indices for the signal and noise components, quality indices can be obtained for objectively characterizing velocity estimates obtained from the time series signal.

DETAILED DESCRIPTION OF THE INVENTION

The present invention relates generally to a method of geophysical exploration and more particularly to a method for obtaining quality indices for objectively characterizing seismic velocity estimates in geophysical data bases.

In order to better understand the present invention, the following introductory discussion is provided. Many well known techniques are available for estimating the velocity of propagation of seismic waves in the earth. Exemplary of such techniques is the pulse transmission method whereby an energy pulse is imparted into one end of a rock sample and a signal is recorded at an opposite end thereof. The recorded signal is a time series representation of the propagation of the energy pulse through the rock sample. Knowing the travel distance through the rock sample, all that is needed to estimate the velocity of the energy pulse is to clock its arrival time $t_a$ at the opposite end of the sample.

Figure 1:
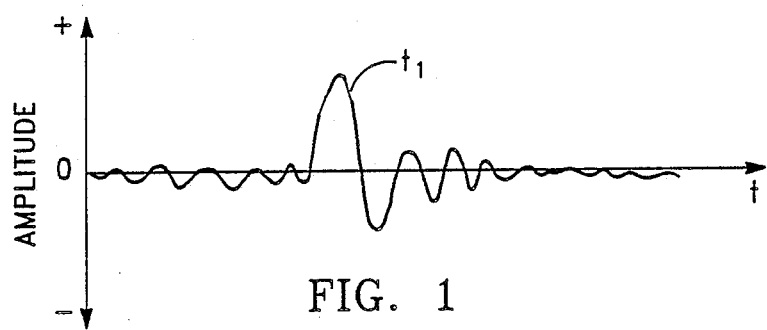
FIG. 1 is a schematic representation of a recorded signal.
Figure 2:
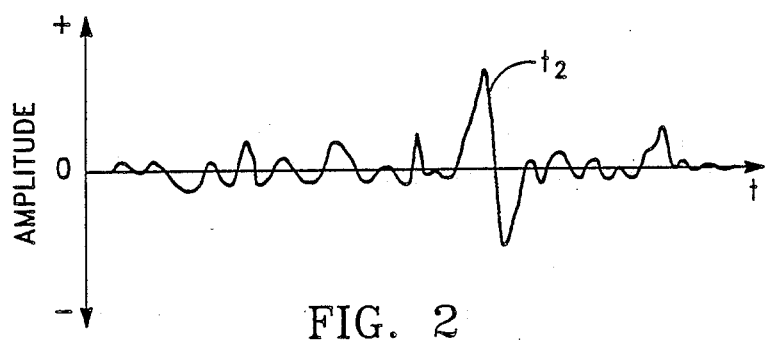
FIG. 2 is a schematic representation of a signal propagating over the same distance as in FIG. 1 but having a considerably different character.

FIGS. 1 and 2 are representative of time series signals ($t_1$ and $t_2$) recorded by the pulse transmission technique for a sample of rock subjected to two different pressures $P_1$ and $P_2$, respectively (where $P_1 > P_2$). The dramatic difference in the quality or character of the two time series signals depicted in FIGS. 1 and 2 clearly demonstrates the different levels of confidence one might assign to arrival times or velocity estimates obtained from each time series signal. Nevertheless, arrival times or velocity estimates are routinely obtained for both types of time series signals and entered into geophysical data bases without any indication about either the difficulty in ascertaining such values or any measure of the confidence or reliability of such estimates. In short, the geophysical data base lacks any objective index of the "goodness" of the estimated seismic velocities. To overcome these disabilities, the present invention provides a novel method for obtaining objective indices for characterizing the degree or level of confidence in seismic velocity estimates in a geophysical data base so as to aid explorationists in the conduct of geophysical exploration.

Figure 3:
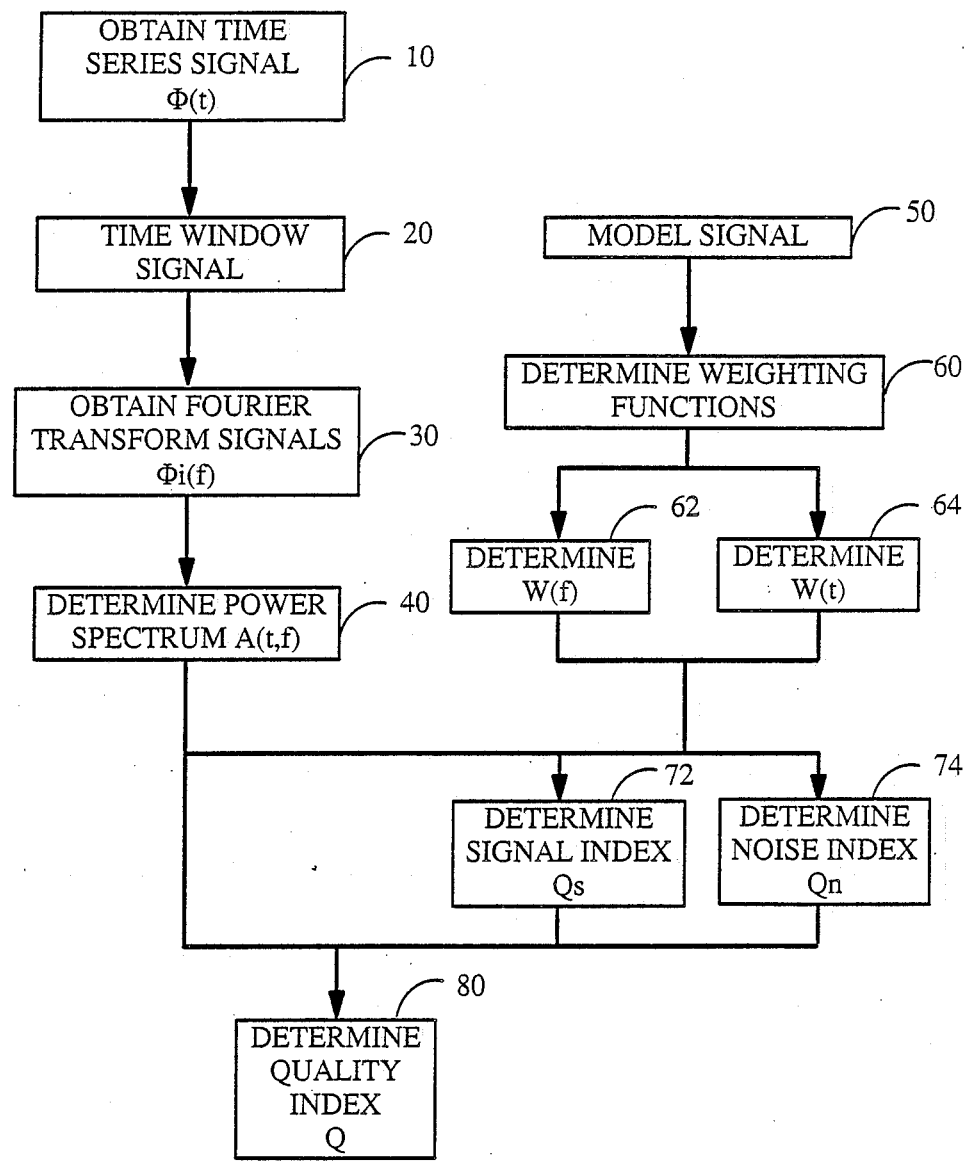
FIG. 3 is a flow diagram of the invention.

Looking now to FIG. 3, a flow diagram of the present invention is provided. At step 10, a time series signal $\phi(t)$ representative of the traveltimes for seismic energy to propagate through the earth is obtained. A time series signal $\phi(t)$ is depicted in panel A of FIG. 4. Although the entire time series signal $\phi(t)$ can be processed, it is more efficient to limit processing to a time window $\Delta T$ encompassing an estimated arrival time $t_a$ of the imparted seismic energy. At step 20, the time series signal $\phi(t)$ is windowed to include a representative length of the time series signal $\phi(t)$ prior to and following an estimated arrival time $t_a$ or velocity obtained by a velocity picking algorithm (e.g., from $t=t_o$ to $t=t_{max}$ where $t_o < t_a < t_{max}$ as shown in panel A of FIG. 4). This time window $\Delta T$ can be predefined through automated or manual velocity picking algorithms so as to include an estimated arrival time and hence velocity for the imparted seismic energy. A novel method for obtaining estimates of the velocity of propagation of seismic energy in the earth is described in commonly owned patent application filed Sept. 1, 1989 (assignee No. 9289), all of which is incorporated by reference herein.

Figure 4:
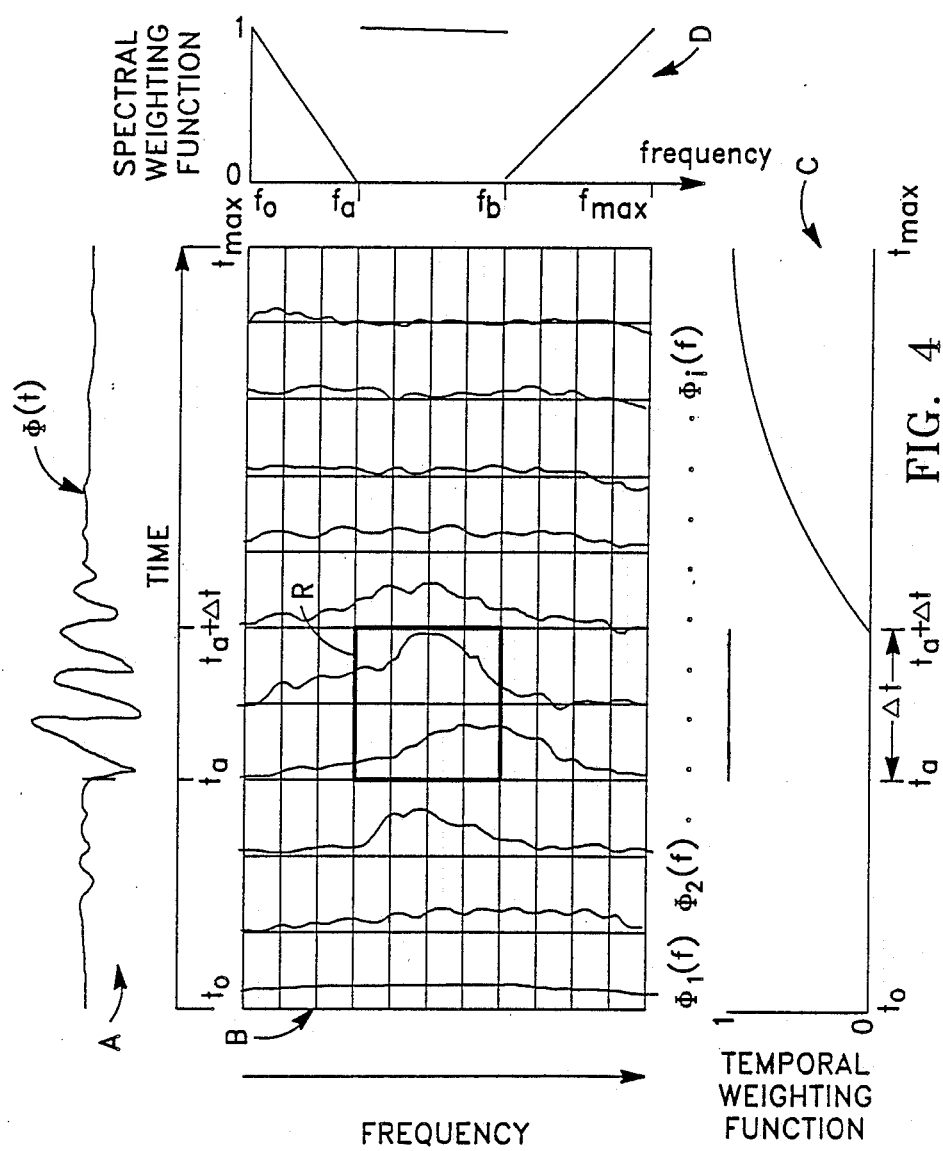
FIG. 4 is a schematic representation of the weighting functions of the present invention.

At step 30, the windowed time series signal $\phi(t)$ is then swept with a sliding window FFT function (fast Fourier transform) to obtain Fourier transform signals $\phi_i(f)$ at selected times, i, in the time window $\Delta T$ as shown in panel B of FIG. 4. It should be noted that panels A and B of FIG. 4 are related by their common axis time. The Fourier transform signal $\phi_i(f)$ at each time i within the time window $\Delta T$ is given by:

$$\phi_i(f) = \int \phi(t) e^{j2\pi ft} dt \qquad (1)$$

where $\phi(t)$ represents the time series signal and f represents frequency.

At step 40, a power spectrum A(f) for the Fourier transformed signal $\phi_i(f)$ at each time i can be obtained according to:

$$A_i(f) = (\phi_i^2(f) + \psi_i^2(f))^{\frac{1}{2}} \qquad (2)$$

where $\psi_i(f)$ is the quadrature component of a complex signal. Since the power spectra A(f) are computed at discrete times i within the time window $\Delta T$, they can be represented as a two-dimensional function of both frequency and time, i.e., time variant power spectra A(f,t). These power spectra A(f,t) can be normalized to the maximum of all such spectra and the normalized amplitudes stored in a two-dimensional matrix.

Based upon characteristics of a model signal at 50, a set of weighting functions can be developed at step 60 to reward signal and penalize noise components in the time series signal. Preferably the characteristics of the model signal comprise the spectral content and temporal extent of a wavelet representative of the imparted energy pulse which generated the time series signals $\phi(t)$. In the time domain, the imparted energy pulse can be very impulsive and is typically of short duration $\Delta t$. Thus, a temporal weighting function W(t) can be developed at 62 which penalizes energy in the recorded time series signal $\phi(t)$ arriving prior to the estimated arrival time (i.e., $t < t_a$). If the arriving energy pulse is followed in the time series signal by energy (i.e., $t > t_a + \Delta t$); it is also penalized but not as dramatically. In particular, the temporal weighting function W(t) can be described according to:

$W(t) = 1$ for $t_a \leq t \leq t_a + \Delta t$ $W(t) = 0$ for $t < t_a$ $W(t) = e^{-\alpha t}$ for $t > t_z + \Delta t$ where $\alpha$ is a selectable damping constant.

The temporal weighting function W(t) thus rewards energy arriving within the times ($t_a \leq t \leq t_a + \Delta t$), all of which is represented in panel C of FIG. 4. Panels B and C of FIG. 4 are related by their common axis time.

Likewise, a spectral weighting function W(f) can be developed at 64 to penalize spectral components outside the band of the model signal (e.g., $f < f_a$ and $f > f_b$) and reward spectral components within the frequency band of the model signal ($f_b \geq f \geq f_a$) as represented in panel D of FIG. 4. In particular, the spectral weighting function W(f) can be described according to:

$W(f) = 1$ for $f_a \leq f \leq f_b$ $W(f) = \left( \dfrac{f - f_o}{f_a - f_o} \right)$ for $f_o \leq f < f_a$ $W(f) = \left( \dfrac{f_{max} - f}{f_{max} - f_b} \right) + K$ for $f_b < f \leq f_{max}$ where $f_o$ and $f_{max}$ are selected minimum and maximum frequencies, respectively. Panels B and D of FIG. 4 are related by their common axis frequency. The weighting functions W(t) and W(f) can be precalculated and stored in a look-up table if execution time is critical. Region R outlined in heavy lines in panel B of FIG. 4 is representative of the two-dimensional character of the combined weighting functions (W(f) and W(t)).

It will be appreciated that the recorded time series signal $\phi(t)$ can also be expressed as the sum of its noise N(t) and signal S(t) components according to:

$$\phi(t) = S(t) + N(t) \qquad (3)$$

Consequently, separate quality indices can be developed for signal and noise components of the recorded time series at step 72 and 74, respectively. In particular, the quality index Qs for the signal component can be expressed as:

$$Q_s = \int W(t) \cdot W(f) \cdot A(f,t) df dt \qquad (4)$$

where W(f) and W(t) are the weighting functions chosen to describe the model signal and A(f,t) represents the power spectra for Fourier transforms of the recorded time series signal $\phi(t)$ at discrete time intervals. The signal quality index Qs of Eq. (4) can be evaluated between the frequencies $f_o$ to $f_{max}$ and the times $t_o$ to $t_{max}$. By assuming that no signal component exists and that the noise component is fixed for all times, i.e., a flat spectrum at each time within the time window $\Delta T$, then A(f,t)=1 and $$Q_s = \int W(t) \cdot W(f) df dt. \qquad (5)$$

Although separate temporal and spectral weighting functions can be developed for the noise component of the recorded time series signal $\phi(t)$, one can advantageously employ the relationship that the sum of the noise and signal components is fixed. Consequently, the temporal and spectral weighting functions for the noise component can be expressed as functions of their signal component counterparts. Thus, the temporal weighting function for the noise component can simply be expressed as $1-W(t)$ and the spectral weighting function for the noise component can simply be expressed as $1-W(f)$. As such the weighting functions for the noise components can be considered to be reciprocals of the weighting functions for the signal components. Thus, a quality index Qn for the noise component of the time series signal $\phi(t)$ can be developed according to:

$$Qn = N \int (1 - W(f)) \cdot (1 - W(t)) \cdot A(f,t) \, dfdt. \quad (6)$$

where N is a normalization constant required to make the ratio of Qs/Qn be unity when only a noise component exists. Let A(f,t) be unity again, this yields:

$$Qn = N \int (1 - W(f)) \cdot (1 - W(t)) \, dfdt \quad (7)$$

By specifying that Qs/Qn=1 when no signal component exists, the value of N ca be obtained according to:

$$N = \frac{\int W(f) \cdot W(t) \, dfdt}{\int (1 - W(f)) \cdot (1 - W(t)) \, dfdt} \quad (8)$$

Thus, N can be computed and stored for a selected set of temporal and spectral weighting functions.

At step 80, a ratio of the two quality indices $Q_s$ and $Q_n$ of Eqs. (5) and (7) can be multiplied by the power spectra A(f,t) to obtain objective indices Q of the quality or level of confidence of the estimated seismic velocity obtained from the time series signal $\phi(t)$. The objective indices Q can be expressed as a matrix of values representative of the triple product of the temporal weighting function W(t), spectral weighting function W(f), and power spectra A(f,t). A single quality index Q' can be obtained by summing this matrix according to:

$$Q' = \frac{Q_s}{Q_n} = \frac{1}{N} \frac{\int W(f) \cdot W(t) \cdot A(f,t) \, dfdt}{\int (1 - W(f)) \cdot (1 - W(t)) \cdot A(f,t) \, dfdt} \quad (9)$$

This quality index Q' is a single value designed to objectively indicate the quality of the estimated seismic velocity and thus provide a quantitative index of the quality or level of confidence in the estimated seismic velocities comprising the geophysical data base. The quality index is based upon the temporal and spectral content as well as the energy of the arriving energy in the time series signal, unlike conventional signal-to-noise (S/N) ratios which typically obtain a measure of the energy of the signal component divided by all remaining energy at a selected time.

While specific temporal and frequency weighting functions have been described and depicted in the figures, those skilled in the art will appreciate that modifications can be made thereto so as to develop objective indices for characterizing other measures included in geophysical data bases. Additionally, there are many practical applications for utilizing such quality indices, especially when attempting to correlate seismic velocities of propagation with other physical properties of rocks. Specifically, one can use these quality indices to weight a least squares regression between selected physical properties of rocks and seismic velocities of propagation, thereby giving more significance to those correlations having the larger quality indices. As such, the scope of the present invention is to be limited only by the scope of the appended claims.

We claim:

1. A method for characterizing seismic velocity estimates obtained from arrival times in time series signals representatives of the propagation of seismic energy imparted into the earth, comprising the steps of:
    (a) obtaining Fourier transform signals of the time series signal at selected time locations about an estimated arrival time cf the imparted seismic energy;
    (b) obtaining a frequency weighting function W(f) to constrain the spectral content of the Fourier transformed signals to that of the imparted seismic energy:
    (c) obtaining a time weighting function W(t) to constrain the temporal content of the Fourier transformed signals to that of the imparted seismic energy;
    (d) obtaining power spectra A(f,t) from the Fourier transformed signals of the imparted seismic energy: and
    (e) obtaining a first index from a product of the frequency weighting function W(f), time-weighting function w(t), and power spectra A(f,t) for characterizing the estimated seismic velocity.

2. The method of claim 1 wherein the spectral weighting function w(f) comprises:

$$W(f) = 1 \quad \text{for } f_a \leq f \leq f_b$$

$$W(f) = \left( \frac{f - f_o}{f_a - f_o} \right) \quad \text{for } f_o \leq f < f_a$$

$$W(f) = \left( \frac{f_{max} - f}{f_{max} - f_b} \right) \quad \text{for } f_b < f \leq f_{max}$$

where: f is frequency, $f_a$ and $f_b$ are the highest and lowest frequencies of the imparted seismic energy, $f_{max}$ and $f_o$ are selected frequencies, respectively, of the imparted seismic energy.

3. The method of claim 1 wherein the temporal weighting function W(t) comprises:

$$W(t) = 1 \text{ for } t_a < t < t_a + \Delta t$$

$$W(t) = 0 \text{ for } t < t_a$$

$$W(t) = e^{-\alpha t} \text{ for } > t_a + \Delta t$$

where: $t_a$ is the estimated arrival time of the imparted seismic energy in the time series signal, $\alpha$ is a damping constant, and $\Delta t$ is the duration of the imparted seismic energy.

4. The method of claim 1 further including the steps of obtaining a second index $Q_s$ for the signal component of the time series signal.

5. The method of claim 1 further including the steps of obtaining a third index $Q_n$ for the noise component of the time series signal.

6. The method of claim 1 further including the steps of:

(a) obtaining a second index for the signal component of the time series signal according to:

$$Q_s = W(t) \cdot W(f) \cdot A(f,t) \, dfdt$$

(b) obtaining a third index for the noise component of the time series signal according to:

$$Q_n = N \int (1 - W(f)) \cdot (1 - W(t)) \cdot A(f,t) dfdt$$

where N is a normalization constant.

7. The method of claim 6, further including obtaining a fourth index of the estimate of seismic velocity from a ratio of the second and third indices of the signal and noise components according to:

$$Q = \frac{1}{N} \frac{Q_s}{Q_n}$$

8. A method for objectively characterizing seismic velocity estimates obtained from time series signals representative of seismic energy propagating through the earth, comprising the steps of:
(a) obtaining a first index representative of the spectral content and temporal extent of the signal component of the time series signal;
(b) obtaining a second index representative of the spectral content and temporal extent of the noise component of the time series signal; and
(c) obtaining a third index for objectively characterizing seismic velocity estimates obtained from the time series signal from a ratio of the first and second indices.

9. The method of claim 8 wherein the second index for the noise component comprises:

$$Q_n = N \int (1 - W(f)) \cdot (1 - W(t)) \cdot A(f,t) \, dfdt$$

where:
W(f) is a weighting function to constrain the spectral content of the time series signal,
W(t) is a weighting function to constrain the temporal extent of the time series signal,
N is a normalization constant, and
A(f,t) is power spectra of the time series signal.

10. The method of claim 9 wherein the first index for the signal component comprises:

$$Q_s = \int W(f) \cdot W(t) \cdot A(f,t) dfdt$$

11. A method for objectively characterizing seismic velocity estimates obtained from time series signals representative of the traveltimes of seismic energy propagating through the earth, comprising the steps of:
windowing a time series signal about an estimated arrival time of the seismic energy;
obtaining Fourier transformed signals of the windowed time series signal;
forming a matrix of weighting functions to constrain the spectral content and temporal extent of the Fourier transformed signals;
obtaining power spectra of the Fourier transformed signals; and
characterizing an estimated seismic velocity obtained from the estimated arrival time with a product of the power spectra and matrix of weighting functions.

12. A method for characterizing seismic velocity estimates obtained from arrival times in time series signals representative of the traveltimes of imparted seismic energy propagating through the earth, comprising the steps of:
obtaining a weighting function constraining the spectral content of the time series signal about an estimated arrival time to that of the imparted seismic energy;
obtaining a second weighting function constraining the temporal extent of the time series signal about the estimated arrival time to that of the imparted seismic energy;
obtaining a measure of the power spectra of the time series signal about the estimated arrival time; and
characterizing the estimated velocity with a product of the first and second weighting functions and the power spectra.

* * * * *

UNITED STATES PATENT AND TRADEMARK OFFICE
CERTIFICATE OF CORRECTION

PATENT NO. : 4,964,086

DATED : October 16, 1990

INVENTOR(S) : RICHARD O'CONNELL, ET AL

It is certified that error appears in the above--identified patent and that said Letters Patent is hereby corrected as shown below:

```
Column 5, line 26, "ca", should read --can--.
Column 6, line 17:
Claim 1, line 7, after "time" delete --cf-- and insert --of--.
Column 6, line 13:
Claim 1, line 3, "representatives" should read --representative--.
```

Signed and Sealed this

Seventh Day of April, 1992

Attest:

HARRY F. MANBECK, JR.

*Attesting Officer*      *Commissioner of Patents and Trademarks*